US012671707B2

(12) United States Patent
Falcione et al.

(10) Patent No.: US 12,671,707 B2
(45) Date of Patent: Jun. 30, 2026

(54) METHOD FOR MONITORING AND ENFORCING SECURE POLICIES IN A DEVICE

(71) Applicant: Exein S.p.A., Rome (IT)

(72) Inventors: Giovanni Alberto Falcione, Rome (IT); Gianluigi Spagnuolo, Rome (IT); Domenico Salvatore, Rome (IT); Hoang Duy Trinh, Rome (IT); Gianni Cuozzo, Rome (IT)

(73) Assignee: Exein S.p.A., Rome (IT)

( * ) Notice: Subject to any disclaimer, the term of this patent is extended or adjusted under 35 U.S.C. 154(b) by 51 days.

(21) Appl. No.: 18/390,066

(22) Filed: Dec. 20, 2023

(65) Prior Publication Data

US 2025/0133097 A1      Apr. 24, 2025

(51) Int. Cl.
*H04L 9/40* (2022.01)

(52) U.S. Cl.
CPC ...... *H04L 63/1425* (2013.01); *H04L 63/1416* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 10,762,201 | B2 * | 9/2020 | Noeth | H04L 63/20 |
| 12,107,872 | B2 * | 10/2024 | Neupane | H04L 63/1416 |
| 12,212,583 | B2 * | 1/2025 | Du | H04L 63/1441 |
| 2009/0044270 | A1 * | 2/2009 | Shelly | H04L 63/02 726/22 |
| 2016/0294858 | A1 * | 10/2016 | Woolward | H04L 63/0263 |
| 2019/0109713 | A1 * | 4/2019 | Clark | G06F 16/182 |
| 2019/0173909 | A1 * | 6/2019 | Mixer | H04L 41/082 |
| 2019/0377881 | A1 * | 12/2019 | Murphy | G06F 18/214 |
| 2019/0379691 | A1 * | 12/2019 | Murphy | H04L 63/0263 |
| 2020/0177372 | A1 * | 6/2020 | Bhamidipati | H04L 9/50 |
| 2020/0195693 | A1 * | 6/2020 | Price | G06F 21/552 |
| 2021/0058424 | A1 * | 2/2021 | Chang | G06F 18/214 |
| 2022/0103593 | A1 * | 3/2022 | Singh | H04L 63/0245 |
| 2023/0007027 | A1 * | 1/2023 | Weingarten | H04L 41/0894 |
| 2023/0385403 | A1 * | 11/2023 | Czerninski | G06F 21/54 |
| 2024/0430680 | A1 * | 12/2024 | Rappard | H04L 63/20 |
| 2025/0039135 | A1 * | 1/2025 | Parla | H04L 63/0236 |
| 2025/0039146 | A1 * | 1/2025 | Zhang | H04L 63/0272 |
| 2025/0039220 | A1 * | 1/2025 | Parla | H04L 63/0236 |

* cited by examiner

*Primary Examiner* — Teshome Hailu
*Assistant Examiner* — Mahabub S Ahmed
(74) *Attorney, Agent, or Firm* — Rankin Hill & Clark, LLP; Erik J. Overberger

(57) ABSTRACT

A method for monitoring and enforcing secure policies in a device includes collecting kernel data from a kernel space by a packet filtering module operating in a user space. The kernel data is processed into events that are transmitted to a data bus, where the events are stored and provided to a policy enforcement module. The policy enforcement module evaluates the events with an algorithm to detect potential threat events. When a threat event is identified, one or more secure policies are selected and executed in the device as corresponding actions or commands. The method enables real-time monitoring of kernel activity and enforcement of security policies while maintaining the architecture in user space.

9 Claims, 2 Drawing Sheets

METHOD FOR MONITORING AND ENFORCING SECURE POLICIES IN A DEVICE

FIELD OF APPLICATION

The present description relates to a method for monitoring and enforcing security policies in a device.

The method of the present description can be enforced against known or unknown cyber security attacks on a device with an operating system installed therein. In particular, the present invention relates to an embedded security solution for protecting devices, and specifically for IoT embedded devices.

DESCRIPTION OF THE TECHNICAL BACKGROUND

Embedded IoT devices are widely used to control other devices or surrounding the environment due to their ability to collect data and communicate with users. Embedded devices are constantly becoming a significant and essential part of everyday life, and their velocity and reliability are improving day by day.

Embedded systems and devices have a significant number of advantages as they can be used in all types of industries, such as automotive, healthcare, aerospace, and defence. In addition, embedded systems are cost effective, energy efficient, and offer a lot of opportunities for improvement and upgrade.

However, embedded systems and devices are potentially exposed to cyber-attacks and malicious activities that may disrupt the security of the system.

Existing solutions provide limited methods for ensuring device security. In particular, known methods and software operate at network, or cloud, level through external programs.

PROBLEMS OF THE BACKGROUND ART

As the known methods are implemented in software external to the device, they are only relevant against network intrusions and network attacks. Moreover, the known methods and software require an active and constant communication with external entities and with the device. Indeed, the security mechanism operates remotely, and the countermeasures identified against the cyber-attacks need to be communicated to the device or to cloud services. As a result, current prior art methods and software may introduce delays in the protection process and may be not fast enough to block a potential threat.

SUMMARY OF THE INVENTION

The object of the invention in question is to provide a method for monitoring and enforcing secure policies in a device able to overcome the drawback of the prior art.

A further object of the present invention is to obtain a method for monitoring and enforcing secure policies in a device, which make it possible to reduce the risks of cyber-attacks and the effort of manual human interventions.

ADVANTAGES OF THE INVENTION

The method for monitoring and enforcing secure policies in a device is an embedded method that allows the observability of the device by evaluating internal processes in the device through direct collection of kernel data, such as processes, system calls, file systems and networking data. In this way, it is possible to achieve a deeper level of protection by embedding the security in the device.

The method of the present invention can also guarantee faster countermeasures against threat events as they are generated directly from the collected kernel data and, unlike prior art methods, the present method does not depend on external sources, such as cloud services.

In particular, by virtue of an embodiment, the method implements enhanced Berkeley Packets Filter probes to communicate directly with the kernel of the operating system. This method is in fact particularly useful for Linux systems.

BRIEF DESCRIPTION OF THE DRAWINGS

The features and advantages of the present invention will become apparent from the following detailed description of a possible practical embodiment thereof, illustrated by way of non-limiting example in the accompanying drawings, in which.

DETAILED DESCRIPTION

The present invention relates to a method for monitoring and enforcing secure policies in a device 1. In particular, the object of the present invention is a method that allows the observability of the device 1, i.e., the measurement of the device's state based on the data it generates, and the protection of the same against cyber-attacks.

In more detail, the present invention allows to monitor and identify the vulnerability of a firmware by means of a method for monitoring and enforcing secure policies embedded in the device 1.

In the attached figures, the number 1 refers to a device 1 that comprises a data storage, for example a hard disk (not shown in the attached figures), in which an operating system OS resides and is installed therein.

Figure 1:
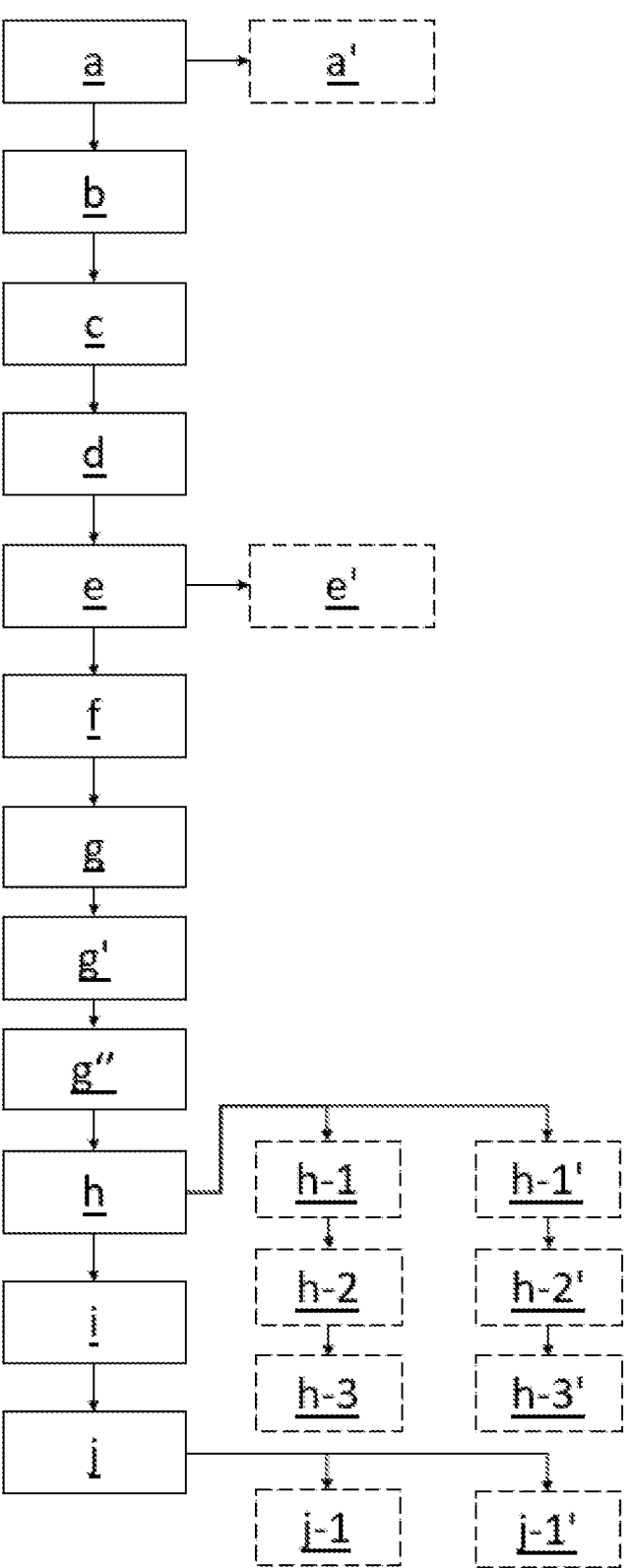
FIG. 1 shows a flowchart of a sequence of steps of an embodiment of the method of the present invention.
Figure 2:
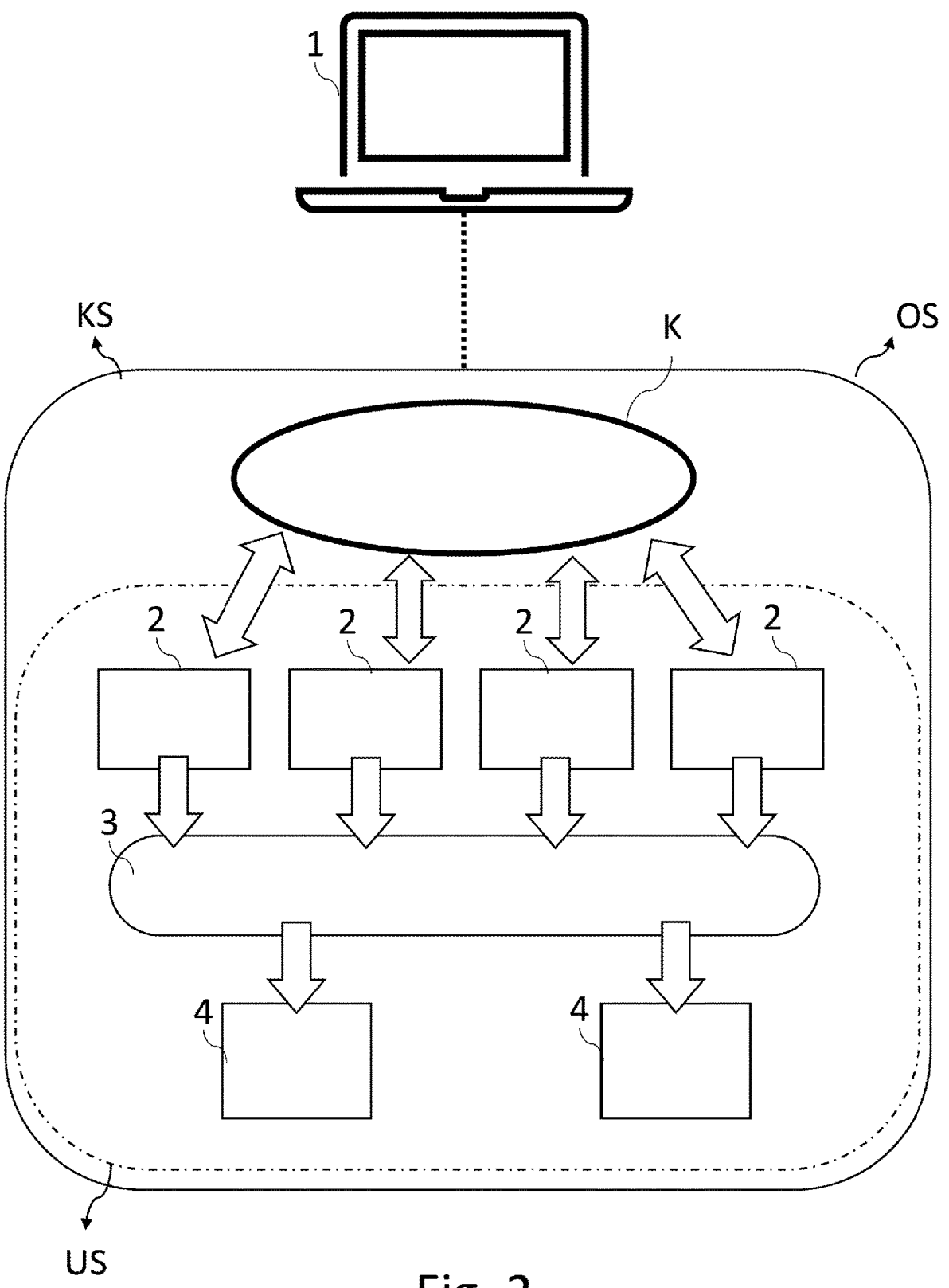
FIG. 2 shows a schematic diagram of a computer program by which the method of FIG. 1 can be executed.

Within the scope of the present invention, the operating system OS, schematically illustrated in FIG. 2, is a software which allows the management of files, memory, processes and the control of input and output and peripheral devices. As is well known to a person skilled in the art, the operating system divides virtual memory into a kernel space KS and a user space US.

Preferably, the operating system OS comprises one of the known operating systems such as Microsoft Windows or one of the Unix-like operating systems based on the Linux kernel.

The method comprises the step of a) providing at least one packet filtering module 2 residing in the user space US of the operating system OS.

The packet filtering module 2 is configured to read and collect kernel data directly from the kernel space KS of the operating system OS and to convert the collected kernel data into one or more corresponding events. More specifically, the packet filtering module 2 is configured to collect granular data with low overhead and to marshalled them into formatted events, which are made available in the user space US.

In the context of the present invention, an event is a message comprising general information or details about the collected data. Each event comprises a header and/or a payload relating to predetermined information, generic or detailed, of the collected kernel data.

Advantageously, the packet filtering module 2 of the present invention allows for an evaluation of internal processes in the device 1 by directly collecting kernel data, thus ensuring security and execution efficiency.

According to the preferred embodiment, the packet filtering module 2 comprises enhanced Berkeley Packet Filter (eBPF). The eBPF is a technology that allows sandboxed programs to run within the operating system kernel and safely extend the kernel capabilities without the need to modify kernel source code or load kernel modules that could cause kernel panic.

The method comprises the step of b) providing a data bus 3 that resides in the user space US of the operating system OS and is in signal communication with the at least one packet filtering module 2 to receive events from the packet filtering module 2. The data bus 3 is hence configured to store the received events.

It should be noted that the data bus 3 is a virtual communication system that allows data to be transferred between components or virtual modules of the device. In other words, the data bus 3 is configured to receive and/or transmit data and to store the received data, which can be accessed by any modules in communication with the data bus.

The method also comprises the step of c) providing a plurality of secure policies residing in the user space US of the operating system OS, each of which comprises a set of executable actions or commands. Preferably, the set of executable actions or commands comprises one or more of: executing operating system functionalities, restricting connection to/from specific IP addresses, and killing undesired running processes. Still preferably, the set of executable actions or commands comprises a list of any action or command that the device can perform to block or counter-attack a cyber security attack.

The method comprises the step of d) providing at least one policy enforcement module 4 that resides in the user space US of the operating system OS and is in signal communication with the data bus 3 to receive events from the data bus 3. The policy enforcement module 4 is configured to execute one or more secure policies in the device.

The method then comprises the step of e) collecting kernel data from the kernel space KS by the packet filtering module 2.

The method further comprises the step of f) processing and converting collected kernel data by the packet filtering module 2 into one or more corresponding events.

The method comprises the steps of g) transmitting one or more events by the packet filtering module 2 to the data bus 3, g') storing the one or more events in the data bus 3 and g") transmitting the one or more events by the data bus 3 to the policy enforcement module 4.

It should be noted that the steps g), g') and g") should be carried out in this specific order only in the first application of the method. In fact, since more events could be transmitted from the packet filtering module 2 to the data bus 3 and stored in the data bus 3, there could be a temporal overlapping of these steps which can depend on the functioning of the device.

The method comprises the step of h) monitoring the device 1 by evaluating the events and identifying one or more threat events by the policy enforcement module 4.

The policy enforcement module 4 comprises an evaluating algorithm configured to receive events and the plurality of secure policies as inputs, to evaluate the received events, to identify threat events and one or more corresponding secure policies based on the identified threat events. Therefore, the output of the algorithm is the identified secure policies and the identified threat events.

The method then comprises the step of i) identifying one or more secure policies from the plurality of secure policies by the policy enforcement module 4 if a threat event is identified by the evaluating algorithm.

Finally, the method comprises the step of j) enforcing the identified secure policies by the policy enforcement module 4 in order to block or counterattack the cyber-attack.

It should be noted that thanks to the direct collection of kernel data, the method of the present invention allows real-time data monitoring, with minimal latency and minimal system overhead. Specifically, the present method allows for a prompt response as it does not require communication with external entities.

According to the preferred embodiment of the present invention, the at least one packet filtering module 2 comprises at least one virtual probe 5, preferably an eBPF probe, which is configured to read and collect kernel data.

It should be noted that the virtual probe 5 is configured to connect the kernel space KS to the user space US in order to extract data from the kernel space SP and make it available in the user space US.

Preferably, the virtual probe 5 is associated with a corresponding activity of the operating system OS. The activity of the operating system OS preferably relates to one of the following: networking, traffic patterns, filesystem, processes, device activities and system calls.

Optionally, the step of a) providing at least one packet filtering module 2 comprises the sub-step of a') providing a plurality of packet filtering modules 2, each one comprising a respective virtual probe 5 associated with a corresponding activity to be monitored. Alternatively, the at least one packet filtering module 2 comprises a plurality of virtual probes 5, wherein each virtual probe 5 is associated with a corresponding activity to be monitored.

It should be noted that, in this way, each virtual probe 5 of the packet filtering module 2, or the respective virtual probe 5 of each packet filtering module 2, is configured to collect and transform kernel data independently from the other virtual probes 5.

According to the preferred embodiment of the present invention, the step of e) processing and converting collected kernel data into one or more events comprises the sub-step of e') generating, for each event, a header and/or a payload as a function of the corresponding collected kernel data. Specifically, the header of the event comprises one or more of timestamp, event type, source module, string or image relating to the event, threat flag. Moreover, the event payload comprises one or more of the following: path of the file, path of the directory, permission set, IP address, filename that has been deleted, port of the source or destination, TPC connection, length of the packet, DNS questions, DNS answers, number or list of arguments passed to the executable.

According to a first embodiment, the evaluating algorithm of the policy enforcement module 4 comprises an algorithm based on Domain Specific Language Rules.

Within the scope of the present invention, a DSL rule is a logical construct defined using a domain specific language shared between the present method and a user who wrote the rule.

Preferably, each DSL rule comprises at least one logical construct defined by a corresponding condition to be verified. More preferably, each DSL rule comprises two logical constructs, i.e., the condition to be verified and at least one corresponding secure policy.

Still according to the first embodiment, the step of h) monitoring the device 1 preferably comprises the sub-step of h-1) comparing the events with one or more conditions of the DLS Rules.

Preferably, the step of h) monitoring the device 1 also comprises the sub-step of h_2) generating a condition output as a function of the comparison, wherein the condition output comprises positive and/or negative condition output.

Still preferably, the step of h) monitoring the device 1 also comprises the sub-step of h-3) generating a threat flag for the corresponding event and marking the event as threat event for a positive condition output.

Still preferably, the step of h) monitoring the device 1 also comprises the sub-step of h_4) identifying at least one corresponding secure policy for the threat event. Still according to the first embodiment of the present invention, the step of j) enforcing the identified secure policy comprises the sub-steps of j-1) evaluating the condition output and enforcing the identified secure policy for positive condition outputs.

According to a second embodiment of the present invention, alternative to the first embodiment, the evaluating algorithm comprises a supervised or semi-supervised machine learning algorithm. In particular, the machine learning algorithm comprises one of the following: neural network algorithm, random forest algorithm, ensemble algorithm.

It should be noted that a supervised algorithm allows a binary classification of each event, whereas a semi-supervised algorithm is preliminarily trained with only with non-threat events, and it then allows each event to be compared with the distribution of observed events.

Preferably, the step of h) monitoring the device 1 comprises the sub-step of h_1') generating a score output for each event. In more detail, in the case of a supervised machine learning algorithm, the sub-step of h_1') generating a score output for each event envisages the generation of a scalar binary output.

Still preferably, the step of h) monitoring the device 1 comprises the sub-step of h_2') generating a threat flag for the corresponding event and marking the event as threat event for scores above a predetermined threshold. In more detail, in the case of a supervised machine learning algorithm, the threat flag is generated on the basis of the comparison of the scalar binary output with a predetermined value, whereas in the case of a semi-supervised algorithm the threat flag is generated when the event is to be considered as deriving from a different distribution with respect to that of the observed events.

Still preferably, the step of h) monitoring the device 1 comprises the sub-step of h_3') identify at least one corresponding secure policy for the threat event.

Still according to the second embodiment of the present invention, the step of j) enforcing the identified secure policy comprising the sub-steps of j-1') evaluating the score output and enforcing the identified secure policy for score outputs above the predetermined threshold.

Advantageously, the method of the present invention allows to reduce the risks of cyber-attacks and to reduce the effort of manual human interventions. In fact, the method is embedded in the device, allowing a deeper level of protection.

Since the method of the present invention is embedded in the device 1 and does not depend on external sources, it can also guarantee faster countermeasures against threat events, since they are generated directly from the collected kernel data.

Furthermore, the method of the present invention thus allows for protection and security enforcement in the device 1 in an autonomous manner.

Another object of the present invention is a computer program residing in the data storage of the device 1, e.g., software, that comprises instructions which, when the program is executed by the device 1, cause the device to carry out the steps of the method of the present description.

An exemplary application of the method of the present invention is described below, for a device IoT Linux configured with industrial gateway functionality and therefore dedicated to routing and packet routing activities.

In the described example, the device 1 comprises a computer program according to the present description that can be run in background then the device is started.

Specifically, the sub-step of a') providing a plurality of packet filtering modules 2 of the method according to the present description, envisages providing at least four eBPF modules, each comprising a virtual eBPF probe 5 for a corresponding system activity. In this example, the system activities relate to networking, file-system, process execution and system calls, each of which is thus monitored independently from the others by a respective eBPF probe.

For each virtual probe 5, the method envisages the sub-step of e') generating for each event a header and a payload for the corresponding system activity. It should be noted that, in the described example, most of the events are likely to be generated by the networking packet filtering module 2, relating to the opening or closing of connections between the gateway and other devices.

In the example described, according to the first embodiment of the present invention, the DLS Rules on which the algorithm of the policy enforcement module 4 is based comprise an IP blacklist, while a corresponding security policy comprises a list of actions relating to the termination of the connection with a specific device. In this way, the method of the present description allows to block or terminate the connection with devices having a corresponding IP reported in the blacklist.

Alternatively, according to the second embodiment, an AI model on which the algorithm of the policy enforcement module 4 is based tracks and flags a sequence of packets as threat events, while a corresponding security policy comprises a list of actions relating to the immediate termination of the connection and the blocking of further accesses. In this way, the method of the present description allows to recognise the flagged packets as an anomalous behaviour of the device 1 or as a malware attack (e.g., a DDOS attack) and to terminate or block the access to the device 1.

The invention claimed is:

1. A method for monitoring and enforcing secure policies in a device, the device comprising a data storage having an operating system residing and being installed therein, the method comprising the steps of:

a) providing at least one packet filtering module residing in a user space of the operating system, the packet filtering module being configured to directly read and collect kernel data from a kernel space of the operating system and convert the collected kernel data into one or more corresponding events, the packet filtering module comprising an enhanced Berkeley Packet Filter;

b) providing a data bus that resides in the user space of the operating system and is in signal communication with the at least one packet filtering module to receive events from the packet filtering module, the data bus being configured to store the received events;

c) providing a plurality of secure policies residing in the user space of the operating system, each secure policy comprising a set of executable actions or commands;

d) providing at least one policy enforcement module that resides in the user space of the operating system and is in signal communication with the data bus to receive events from the data bus, the policy enforcement module being configured to execute one or more secure policy in the device, wherein the packet filtering module, the data bus, and the policy enforcement module define an embedded security architecture operating entirely within the user space;

e) collecting kernel data from the kernel space by the packet filtering module;

f) processing and converting collected kernel data by the packet filtering module into one or more corresponding events, each event comprising at least one of a header and a payload relating to predetermined information of collected kernel data;

g) transmitting one or more events to the data bus by the packet filtering module, g') storing the one or more events in the data bus and g") transmitting the one or more events to the policy enforcement module by the data bus;

h) monitoring the device by evaluating events and identifying one or more threat events by the policy enforcement module, the policy enforcement module comprising an evaluating algorithm configured to receive events and the plurality of secure policies as input, evaluate the received events, identify threat events and one or more corresponding secure policies on the basis of the identified threat events, wherein the evaluating algorithm resides and operates autonomously on the device;

i) identifying in real time one or more secure policies from the plurality of secure policies by the policy enforcement module if a threat event is identified by the evaluating algorithm;

j) enforcing the identified secure policies by the policy enforcement module.

2. The method according to claim 1, wherein:

the at least one packet filtering module comprises at least one virtual probe, the virtual probe being configured to read and collect kernel data, and the virtual probe is associated with a corresponding activity of the operating system, the activity relating to one of networking, traffic patterns, filesystem, processes, device activities and system calls.

3. The method according to claim 2, wherein the step of a) providing at least one packet filtering module comprises the sub-step of providing a') a plurality of packet filtering modules, each comprising a respective virtual probe associated with a corresponding activity to be monitored.

4. The method according to claim 1, wherein the step of e) processing and converting collected kernel data into one or more events comprises the sub-step of e') generating for each event at least one of a header and a payload as a function of corresponding collected kernel data, and wherein:

the header of the event comprises one or more of time-stamp, event type, source module, string or image relating the event, threat flag;

the payload of the event comprises one or more of path of the file, path of the directory, permission set, IP address, port of the source or destination, TPC connection, length of the packet, DNS questions, DNS answers, number or list of arguments passed to the executable.

5. The method according to claim 1, wherein the evaluating algorithm of the policy enforcement module comprises an algorithm based on Domain Specific Language Rules, each DSL rule comprising a corresponding condition to be verified.

6. The method according to claim 5, wherein the step of h) monitoring the device comprises the sub-steps of:

h-1) comparing the events with one or more conditions of the DLS Rules, h-2) generating a condition output as a function of the comparison, the condition output comprising at least one of positive and negative condition output, h-3) generating a threat flag for the corresponding event and marking the event as threat event for a positive condition output, h-4) identifying at least one corresponding secure policy for the threat event.

7. The method according to claim 5, wherein the step of j) enforcing the identified secure policy comprising the sub-steps of:

j-1) evaluating the condition output and enforcing the identified secure policy for positive condition outputs, or j-1') evaluating the score output and enforcing the identified secure policy for score outputs above the predetermined threshold.

8. The method according to claim 1, wherein the evaluating algorithm comprises a supervised or semi-supervised machine learning algorithm, the machine learning algorithm comprising one of neural network algorithm, random forest algorithm, ensemble algorithm.

9. The method according to claim 8, wherein the step of h) monitoring the device comprises the sub-steps of:

h-1') generating a score output for each event, h-2') generating a threat flag for the corresponding event and marking the event as threat event for scores above a predetermined threshold, h-3') identify at least one corresponding secure policy for the threat event.

* * * * *